United States Patent [19]

Shiga et al.

[11] 4,382,065
[45] May 3, 1983

[54] FLUIDIZED BED APPARATUS AND METHOD OF USING

[75] Inventors: Akinobu Shiga; Masahiro Kakugo; Koji Yamada; Hajime Sadatoshi, all of Niihama, Japan

[73] Assignee: Sumitomo Chemical Company, Limited, Osaka, Japan

[21] Appl. No.: 304,871

[22] Filed: Sep. 23, 1981

[30] Foreign Application Priority Data

Sep. 26, 1980 [JP] Japan .................... 55/134820

[51] Int. Cl.³ ............................ F27B 15/08
[52] U.S. Cl. ............................ 422/147
[58] Field of Search ..................... 422/147

[56] References Cited

U.S. PATENT DOCUMENTS

| 2,337,684 | 12/1943 | Scheineman | 422/147 X |
| 2,378,607 | 6/1945 | Watts | 422/147 X |
| 2,687,343 | 8/1954 | Crack . | |
| 2,741,546 | 3/1956 | Sweeney | 422/147 |
| 2,850,363 | 9/1958 | Jonhig | 422/147 X |
| 3,903,016 | 9/1975 | Hartley . | |
| 4,161,917 | 7/1979 | Jubb . | |
| 4,229,194 | 10/1980 | Baillie . | |

FOREIGN PATENT DOCUMENTS

| 51-48151 | 12/1976 | Japan . | |
| 927660 | 5/1963 | United Kingdom . | |
| 939146 | 10/1963 | United Kingdom . | |
| 714122 | 2/1976 | U.S.S.R. | 422/147 |

*Primary Examiner*—Robert L. Lindsay, Jr.
*Attorney, Agent, or Firm*—Cushman, Darby & Cushman

[57] ABSTRACT

In a fluidized bed apparatus intended to fluidize solid particles by means of ascending stream gas, the improvement for reducing solid particles entrained from the apparatus, which comprises placing an internal in a free board of the apparatus so that the projected area ratio is not less than 0.8, and the opening proportion to the free board cross-sectional area is within 0.3 to 0.9.

6 Claims, 11 Drawing Figures

FIG. 2-a
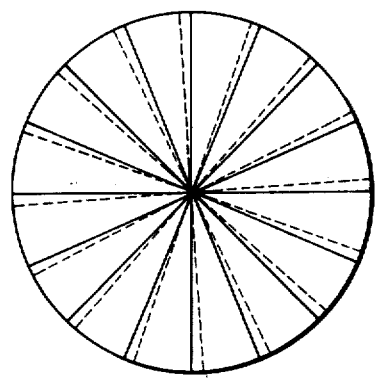
FIG. 2-b
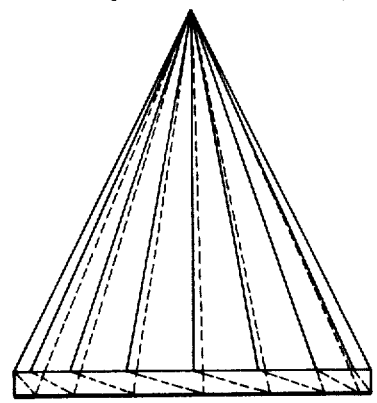
FIG. 2-c
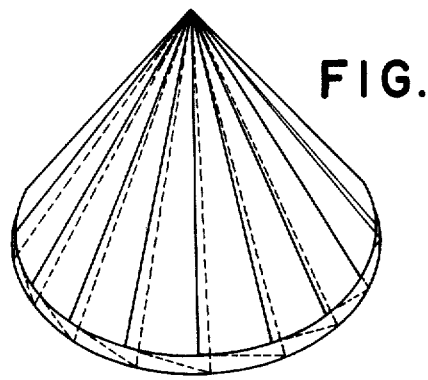
FIG. 3-a
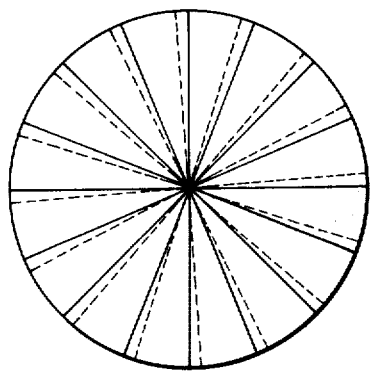
FIG. 3-c
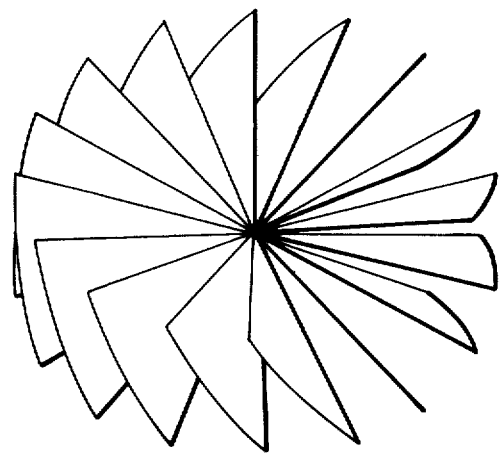
FIG. 3-b

FLUIDIZED BED APPARATUS AND METHOD OF USING

The present invention relates to an improvement for reducing the solid particles entrained from a fluidized bed apparatus, when operating the fluidized bed apparatus, along with the upward gas stream forming the fluidized bed.

As well-known, the fluidized bed apparatus comprises a vertical cylinder vessel composed mainly of a gas supply, gas distributor, fluidized bed portion (fluidized bed) and a free board.

The fluidized bed is a zone of solid particle fluidized by an upward gas stream. This fluidized bed apparatuses are used in various field, for example, production of high-octane numbered gasoline by cracking a high boiling point fraction above the kerosene of oil with fluidized catalyst (which is generally known as FCC process), production of a gas mainly composed of olefin by cracking a heavy oil of petroleum with fluidized heating medium solid particles, drying of wet solid granules by fluidizing with high temperature gas, synthesis of acrylonitrile by reacting propylene, ammonia and oxygen (air) with a fluidized catalyzer composed of a metal salt of a phosphomolybdic acid or phosphowolframic acid, and production of α-olefin polymers by polymerizing α-olefins in the fluidizing bed containing solid polymerization catalyst.

In any method, if drift of fluidized solid particles from the apparatus along with the upward gas stream is excessive, many disadvantages are caused. That is, it becomes necessary to provide a device for separating the solid particles entrained from the gas passed through the apparatus, and further, a device for recycling separated particles to the fluidized bed.

As the result of intensive investigations in order to overcome these disadvantages, the present inventors found out a method of reducing entrainment of particles from the fluidized bed apparatus, by placing a specified internal in the free board of the fluidized bed apparatus, thereby causing the particles accompanying the gas to impinge against it, and thus they have reached this invention.

Hereinafter, the present invention will be described by exemplifying the method for polymerizing an α-olefin in a fluidized bed reactor, which is a kind of fluidized bed apparatus.

Polymerization of an α-olefin by means of a fluidized bed reactor has been previously proposed.

That is, as proposed in Japanese Examined Patent Publication No. 24679/1968 or 597/1966, when the fluidized gas flow rate is relatively low, not more than 15 cm/sec, a method has been proposed to prevent chunk formation by using an agitator so as to mix the particle bed uniformly.

Generally, however, it is difficult to mix powder uniformly by agitator, and an enormous agitating power is needed to achieve such uniform mixing in the reactor as the proposed one. Besides, designing of the shape of agitating blades is much complicated and difficult.

A method to overcome such problems has been proposed in Japanese Examined Patent publication No. 13962/1972, wherein as far as the fluidizing gas flow velocity is sufficiently higher, as high as, about 1.5 to 10 times, than the minimum fluidization velocity (Umf) of polymer particles, a stable fluidized bed may be obtained easily without particularly using any agitator.

Nevertheless, as the fluidizing gas flow velocity increases, the ejection height of solid particles from the fluidized bed becomes higher, so that the number of particles entrained from the reactor increases extremely.

As the method of solving this problem, in turn, installation of a velocity reduction zone expanding the cross-sectional area of the fluidized bed has been proposed. But prevention of entrainment in this method requires an extremely large volume of the free board in the reactor, and if such large volume is realized, the productivity of the reactor per unit volume is significantly lowered and the quantity of monomer to be purged notably increases when changing the monomer composition.

In an other technique, a method of placing an internal in the free board has been proposed. That is, according to Japanese Examined Patent Publication No. 48151/1976, installation of internal members composed of bar or tube members arranged in the horizontal direction in multiple stages has been proposed. In this method, the projected area ratio of the whole structure is set over 0.4 by keeping the projected area ratio of one stage of internal members to the cross-sectional area of free board below 0.5 and placing them in three or more stages. Even in this method, however, since the entrainment preventive effect per stage is small and the ascending gas flows in a route to surround the internals even if placed in multiple stages, impingement efficiency of particles decreases and, in effect, the entrainment preventive effect is small. Therefore, in order to obtain a sufficient effect in this method, it is necessary to increase the number of stages, but in this case, the large volume of free board remains an unsolved problem, thus leading to a contradiction.

A major objective of the present invention is to eliminate said conventional defects and substantially increase the productivity of the reactor per unit volume, by presenting a method to significantly reduce the entrainment of solid particles from the reactor.

According to the present invention, in a fluidized bed apparatus in which solid particles are fluidized by means of a ascending stream gas, there is provided an improved apparatus, for reducing solid particles entrained from the apparatus, which comprises placing an internal in a free board of the apparatus so that the projected area ratio is not less than 0.8, preferably 0.9 or more and the opening proportion to the free board cross-sectional area is within 0.3 to 0.9, preferably 0.5 to 0.9.

The opening proportion referred to in this invention is defined as the ratio of the area of the narrowest of passages capable of passing gases to the cross-sectional area of the free board.

The internal of the present invention may be a simple combination of plates in horizontal direction, but preferably a combination of blades having an angle larger than the angle of repose of particles (more than 30° in ordinary α-olefin particles). Furthermore, the most preferable one is a combination of blades having such an angle that a downward discharge flow is developed when the internal is rotated, with the spacing of neighboring blades very narrow or partially overlapping when projected on the horizontal plane. In this method, since the projected area ratio to the free board sectional area and the opening proportion can be taken considerably large even in one stage, it is possible to remarkably reduce the volume of the free board.

The conditions for embodiment of the present invention are described more specifically below.

(1) The internal of the present invention may be preferably applied to a fluidized bed apparatus which is fluidized by an ascending stream of gas in the range of 1.0 to 10.0 times the minimum fluidization velocity of particles (abbreviated as Umf).

(2) The projected area ratio on the horizontal plane of the installing place of the internal to the free board sectional area is closely related with the entrained amount of solid particles. By controlling the projected area ratio above 0.8, or preferably above 0.9, the entrainment of solid particles from the reactor may be significantly reduced.

(3) When the opening proportion of the internal to the free board sectional area is small, the particles scattered on the internal are hard to fall on the fluidized bed, and a large amount of particles is left over on the internal surface, so that the entrainment from the reactor is rather increased. As the result of investigations by the present inventors, it has been found that by keeping the flow of gas at the opening portion of the internal below the terminal velocity of particles, the amount of particles deposited on the internal can be significantly reduced. More specifically, favorable results will be obtained by determining the opening proportion to the free board sectional area above 0.3, preferably above 0.5.

(4) It is preferable to rotate the internal. Especially in the case of an assembly of plates inclined at such an angle as to develop downward discharge flow, larger downward moving energies can be applied to the particles by impingement when rotated, as compared with the case of fixed insert, so that the entrainment preventive effect is greatly enhanced. Another meaning of rotation is in separation of particles deposited or accumulated on the surface of the internal. The larger the rotating speed, the greater becomes the effect. But if the speed is too high, vortex flows increase, which cause an increase in deposit on the wall surface. Accordingly, favorable results may be obtained when the peripheral speed of the end of internal is in the range of 50 to 500 cm/sec. Although the effect is reduced, the internal of the present invention may be placed in fixed position.

The present invention is described in further details below by referring to the drawings in which FIG. 1 shows the vertical section view of one embodiment of a fluidized bed apparatus;

FIGS. 2-a and 3-a show the front view of an internal of tuyere structure having a conical form and an internal of propeller for structure, respectively, FIGS. 2-b and 3-b are the plan view of the same;

FIGS. 2-c and 3-c show a 45° oblique view from the horizontal plane.

Figure 7:
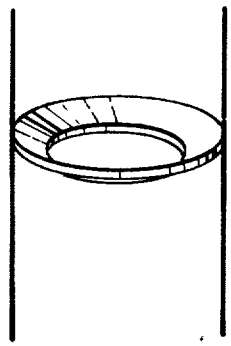

FIG. 7 exemplifies the ring body.

The following symbols are used in the drawings.

$D_T$: inside diameter of fluidized bed apparatus (free board)
$D_1$: inside diameter of ring
$D_2$: diameter of disc
$H_1$: distance from disc to ring
1: fluidized bed apparatus
2: gas inlet
3: gas distributor
4: fluidized bed
5: free board
6: internal
7: gas out let First referring to FIG. 2, the internal in tuyere structure having a conical shape shown in the front and plan and 45° oblique view outline drawings are provided with the following conditions.

(1) The projected area ratio to the free board sectional area, $[(D_T - 2l_1)/D_T]^2$, is not less than 0.8, preferably not less than 0.9.

Herein, $l_1$ is distance from the end of the longest blade of the insert of tuyere structure to the inner wall of the fluidized bed type reactor.

(2) The number of blades is not specifically limited, but the adjacent blades are overlapped with each other when projected on a horizontal plane.

(3) The internal is a part of the section including the apex of a cone, and an assembly of triangular or polygonal blades including the ridges, of which opening proportion is not less than 0.3, preferably not less than 0.5.

(4) The inclination angle of the cone is larger than the angle of repose of particles, and it is desired to have an inclination angle of not less than 30°.

(5) Said internal may be a fixed matter, but it is preferable to rotate them by mounting on an agitating device.

(6) The blades may sufficiently be planes, but may be also bent in waveform or arch-like structure, or constituted in flat structure of tube material arrangement.

(7) Said internal mentioned in (1) to (6) may be also structured in an inverted conical form.

FIG. 3 shows the outline drawing of the internal of a propeller fan structure consisting of combination of inclined blades. The internal is an assembly of blades inclined more than the angle of repose (45° in FIG. 2) with respect to the horizontal plane. The internal in FIG. 3 satisfies the conditions (1), (2), (5), (6) and (7) in FIG. 2.

Figure 4:
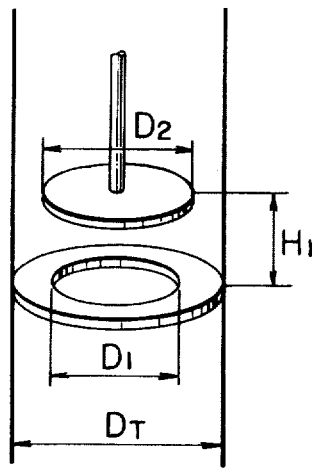
FIGS. 4 and 5 illustrate internal consisting of disc and ring.
Figure 5:
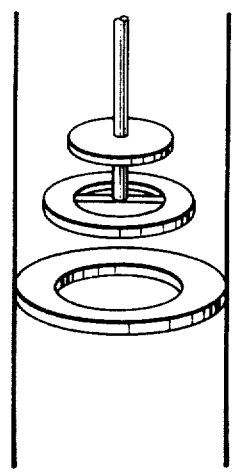

The internal is most preferably an assembly of inclined blades in the light of minimization of entrainment of solid particles, but structures shown in FIG. 4 and FIG. 5 may be also applicable.

FIG. 4 is an outline drawing of internal composed of disc and ring, of which conditions are as follows:

(1) The ring is determined so that its outside diameter may be equal to the tower diameter of the reactor $D_T$ and that the inner diameter ($D_1$) may set the opening proportion $[(D_1/D_T)^2]$ not less than 0.3, or preferably not less than 0.5.

(2) The disc, sharing the same center with the ring, has its diameter ($D_2$) determined so that the opening proportion $[(D_T^2 - D_2^2)/D_T^2]$ may be not less than 0.3, preferably not less than 0.5, and has $D_1$ and $D_2$ determined so that the projected area ratio on the horizontal plane to the free board sectional area, $1 - (D_1^2 - D_2^2)/D_T^2$, may be not less than 0.8.

(3) The spacing $H_1$ between the ring and disc is determined so that the opening proportion $[4D_1H_1/D_T^2]$ may be less than 0.3, preferably not less than 0.5.

(4) The disc may be situated above the ring as shown in FIG. 4, or below it.

(5) The combination may be one disc and one ring as shown in FIG. 4, or two rings and one disc, for instance, as shown in FIG. 5. The spacing of stages conforms to (3), and the diameter of disc and inside diameter and outside diameter of ring conform to (1) and (2). The structure may consist of more than two stages.

Figure 6:
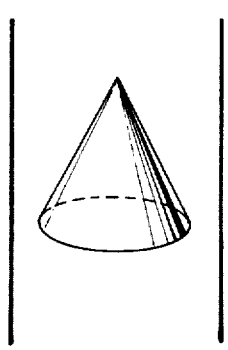
FIG. 6 shows one example of disc body.

(6) The disc may be a flat body, or may be bend in waveform or arch-like structure. Or a conical form wider than the angle of repose as shown in FIG. 6 may be preferable. Though a rotating structure is preferable, a fixed body may be used as well.

(7) The ring may be a flat body, or may be bent in waveform or arch-like structure. Or a structure inclining more than the angle of repose toward the center as shown in FIG. 7 may be preferable. Though a rotating structure is preferable, a fixed body may be used as well.

The internal of the present invention is not limited merely by the structures described in FIGS. 2, 3 and 4, but it is sufficient that the projected area ratio on the horizontal plane of the internal to the free board sectional area be not less than 0.8, preferably not less than 0.9. By placing such internal in the free board of a fluidized bed apparatus, the effect of preventing the solid particles from entraining above the internal may be substantially obtained.

Hereunder the present invention is described in further details by referring to the examples and comparative examples.

EXAMPLE 1

In a glass fluidized bed apparatus measuring 20 cm in inside diameter and 150 cm in height, an internal having a structure shown in FIG. 2 was placed at a position of 60 cm from the gas dispersion board (gas distributor).

In the structure of the internal, the inclination angle of the cone was 60°, the height about 20.4 cm, and the number of blades was 16. When projected on the horizontal plane, the blades overlapped with each other at a maximum of 5 mm, and the maximum length of blades projected on the horizontal plane in the radial direction was 9.5 cm from the center. The projected area ratio of the internal to the free board sectional area on the horizontal plane was 0.9, and the opening proportion to the free board sectional area was 0.64. The internal was mounted on the rotating shaft. This fluidized bed apparatus was filled with 6 kg of polypropylene particles of almost spherical form of which average particle size was 570 microns. The stationary bed height of particles at this time was about 40 cm.

Then, under atmospheric pressure, demoistured air used as fluidizing gas was supplied from the lower part of the gas dispersion board (gas distributor) at the free board velocity of 40 cm/sec, and the rotating shaft was rotated at a rate of 241 rpm. In this setting, ejection height of particles was visually observed, and no particles ejected further than 36.5 cm from the top of the internal, that is, from the surface of stationary bed.

Meanwhile, the minimum fluidization velocity of the particles used was 10 cm/sec.

EXAMPLE 2

The same fluidized bed apparatus as used in Example 1 was used. The internal was placed at a position of 60 cm from the dispersion board by providing the ring shown in FIG. 4 and putting the disc 5 cm above this ring. The outside diameter of the ring was 20 cm and the inner diameter was 14 cm. The ring was flat one. The disc was also a flat one measuring 16 cm in outside diameter. Both the ring and the disc were fixed bodies. The projected area ratio on the horizontal plane of the internal to the free board sectional area and opening proportion were respectively 1 and 0.36.

The same particles as used in Example 1 were used. Under the similar conditions, the particle ejection height was measured. The maximum height observed was about 7 cm above the disc.

COMPARATIVE EXAMPLE 1

Without installing internal, the same fluidized bed apparatus as in Example 1 was used, and the particle ejection height was measured under the same conditions, using the same particles as in Example 1.

At this time, steady height of particles ejecting above was about 60 cm from the surface of particle stationary bed height, and some particles ejected even about 95 cm high occasionally.

EXAMPLE 3

Figure 1:
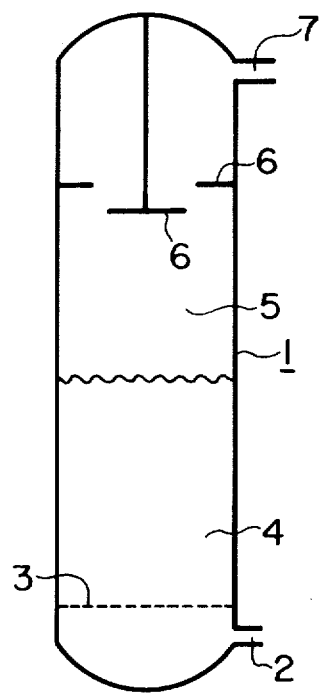

In a fluidized bed type reactor measuring 50 cm in inner diameter and 300 cm in height, an internal having a structure as shown in FIG. 1 was placed at a position of 150 cm high above the dispersion board. In the structure of the internal, the inclination angle of the cone was 60°, the height was about 51 cm, and the number of blades was 16. When projected on the horizontal plane, the blades overlapped with each other at the maximum of 8 mm, and the maximum length of the blades was 24 cm in the radial direction from the center. The internal was mounted on the rotating shaft. The projected area ratio on the horizontal plane of the internal to the free board sectional area and opening proportion were respectively 0.92 and 0.66.

This fluidized bed type reactor was filled with 100 kg of polypropylene particles of nearly spherical form, of which average particle size was 570 microns. At this time, the stationary bed height of particles was measured by fiberscope observation in the apparatus, and was 115 cm.

Then pressurizing up to 15 kg/cm$^2$G with ethylene, the circulating gas compressor provided in said reactor system was operated to supply circulating gas from the lower part of the gas distributor to fluidize the particles while rotating the rotating shaft at a rate of 80 rpm. In this condition, the particle ejection height was measured.

In the measurement, cup-shaped particle collectors with a bottom measuring 4.5 cm in inner diameter and 4.5 cm in height were linked with chain at 10 cm intervals, and suspended from the upper part of the reactor, and were taken out after fluidizing at specified gas flow rate for 30 minutes. The particle ejection height was determined from the capturing state in each cup.

In this method, by varying the gas flow rate in the range of 80 to 140 m$^3$/hr, the particle ejection height from the top of the stationary bed was determined. As the result, no particles were captured above the internal. The minimum fluidization velocity at this pressure was about 40 m$^3$/hr.

COMPARATIVE EXAMPLE 2

Without installing internal, the same fluidized bed type reactor as in Example 3 was used, and the particle ejection height was measured under the same conditions, using the same particles as in Example 3. The results are shown below.

| Gas flow rate m$^3$/hr | Particle ejection height cm |
| --- | --- |
| 80 | 90 |
| 110 | 120 |
| 140 | 160 |

EXAMPLE 4

Using the same reactor as in Example 3, an internal having a structure as shown in FIG. 3 was placed at a position of 150 cm from the gas distributor. In the structure of the internal, the inclination angle was 45°, the width of the blade at its top was 150 mm, and the number of blades was 16. When projected on the free board section, the blades overlapped with each other at the maximum of 20 mm, and the maximum length in the projected view was 24 cm in the radial direction from the center. The internal was mounted on the rotating shaft, as in the case of Example 3. The projected area ratio on the horizontal plane of the internal to the free board sectional area and opening proportion were respectively 0.92 and 0.78.

Exactly in the same manner as in Example 3, polypropylene particles were fluidized, and the gas flow rate was varied in the range of 80 to 140 $m^2$/hr. Particle ejection height was measured in this state. The internal was rotated at a rate of 80 rpm.

As the result of measurement, particles were scarcely captured above the internal.

We claim:

1. A fluidized bed apparatus in which solid particles are fluidized by means of an ascending stream gas, said fluidized bed apparatus being provided in the free board thereof with an internal element at least a part of which rotates; said internal element being a member selected from a group consisting of:
   (a) an internal element having a rotating body possessing a tuyere structure of conical shape so that the projected area ratio to the free board sectional area expressed in $[(D_T - 2l_1)/D_T]^2$ is not less than 0.8 and the opening proportion to the free board sectional area is not less than 0.3, where $D_T$ represents the inside diameter at free board of the fluidized bed apparatus and $l_1$ represents the distance from the end of the longest blade to the inner wall of the fluidized bed apparatus;
   (b) an internal element having a propeller fan structure which is an assembly of inclined blades and has the projected area ratio to the free board sectional area expressed in $[(D_T - 2l_1)D_T]^2$ of not less than 0.8 and the opening proportion to the free board sectional area of not less than 0.3; and
   (c) an internal element consisting of a combination of disc or cone, and annular body, in which the annular body has an outer diameter equal to the diameter of the reactor and the opening proportion expressed in $[(D_1/D_T)^2]$ of not less than 0.3 wherein $D_1$ represents the inner diameter, and the disc or cone shares the same center with annular body and has the opening proportion expressed $[(D_T^2 - D_2^2)/D_T^2]$ of not less than 0.3 wherein $D_2$ represents the bottom diameter of the disc or cone and the projected area ratio of the free board sectional area expressed in $[1 - (D_1^2 - D_2^2)/D_T^2]$ of not less than 0.8.

2. An apparatus according to claim 1 wherein the rotating internal is an assembly of blades inclined at such an angle as to develop downward discharge flow by rotation.

3. An apparatus according to claim 2 wherein the internal of rotating body is inclined more than the angle of repose with respect to the horizontal plane.

4. A method for reducing solid particles entrained in a fluidized bed apparatus in which solid particles are fluidized by means of an ascending stream gas comprising reducing the entrained solid particles by providing in the free board of said apparatus an internal element at least a part of which rotates. rotating said part; said internal element being a member selected from a group consisting of:
   (a) an internal element having a rotating body possessing a tuyere structure of conical shape so that the projected area ratio to the free board sectional area expressed in $[(D_T - 2l_1)/D_T]^2$ is not less than 0.8 and the opening proportion to the free board sectional area is not less than 0.3, wherein $D_T$ represents the inside diameter at free board of the fluidized bed apparatus and $l_1$ represents the distance from the end of the longest blade to the inner wall of the fluidized bed apparatus;
   (b) an internal element having a propeller fan structure which is an assembly of inclined blades and has the projected area ratio to the free board sectional area expressed in $[(D_T - 2l_1)/D_T]^2$ of not less than 0.8 and the opening proportion to the free board sectional area of not less than 0.3; and
   (c) an internal element consisting of a combination of disc or cone, and annular body, in which the annular body has outer diameter equal to the diameter of the reactor and the opening proportion expressed in $[(D_1/D_T)^2]$ of not less than 0.3 wherein $D_1$ represents the inner diameter, and the disc or cone shares the same center with the annular body and has the opening proportion expressed in $[(D_T^2 - D_2^2)/D_T^2]$ of not less than 0.3 wherein $D_2$ represents the bottom diameter of the disc or cone and the projected area ratio to the free board sectional area expressed in $[1 - (D_1^2 - D_2^2)/D_T^2]$ of not less than 0.8.

5. A method according to claim 4 wherein the rotating internal is an assembly of blades inclined at such an angle as to develop downward discharge flow by rotation.

6. A method according to claim 5 wherein the internal of rotating body is inclined more than the angle of repose with respect to the horizontal plane.

* * * * *